US009187654B2

(12) United States Patent
Feeney et al.

(10) Patent No.: US 9,187,654 B2
(45) Date of Patent: Nov. 17, 2015

(54) BARRIER COATINGS POST-FORMATION TREATED WITH MULTI-VALENT METAL CATIONS

(76) Inventors: Carrie A. Feeney, Bridgewater, NJ (US); Harris A. Goldberg, Edison, NJ (US); Michele Farrell, Bethlehem, PA (US)

( * ) Notice: Subject to any disclaimer, the term of this patent is extended or adjusted under 35 U.S.C. 154(b) by 375 days.

(21) Appl. No.: 13/318,023

(22) PCT Filed: Apr. 30, 2010

(86) PCT No.: PCT/US2010/001285
§ 371 (c)(1),
(2), (4) Date: Oct. 28, 2011

(87) PCT Pub. No.: WO2010/129032
PCT Pub. Date: Nov. 11, 2010

(65) Prior Publication Data
US 2012/0053281 A1  Mar. 1, 2012

Related U.S. Application Data

(60) Provisional application No. 61/215,516, filed on May 6, 2009.

(51) Int. Cl.
*C08K 3/34* (2006.01)
*C09D 167/00* (2006.01)
*C08G 63/688* (2006.01)
*C09D 7/12* (2006.01)

(52) U.S. Cl.
CPC ............ *C09D 7/1216* (2013.01); *C09D 167/00* (2013.01); *C08K 3/34* (2013.01); *C08K 3/346* (2013.01)

(58) Field of Classification Search
CPC ........ C09D 167/00; C08K 3/34; C08K 3/346; C08G 63/688
USPC .......... 524/445–447; 427/331, 337, 340–341, 427/343
See application file for complete search history.

(56) References Cited

U.S. PATENT DOCUMENTS

| | | | | |
|---|---|---|---|---|
| 4,336,685 A * | 6/1982 | Eisenstein | ........................ | 57/238 |
| 5,348,832 A | 9/1994 | Sacripante et al. | ............ | 430/109 |
| 6,083,605 A * | 7/2000 | Harada et al. | .................. | 428/143 |
| 6,475,581 B2 * | 11/2002 | Lustig et al. | .................. | 428/36.6 |
| 6,537,363 B1 | 3/2003 | Golley et al. | .................. | 106/486 |
| 6,564,199 B1 | 5/2003 | Pruett et al. | .................... | 706/486 |
| 6,610,137 B2 | 8/2003 | Golley et al. | .................. | 106/486 |
| 6,616,749 B1 | 9/2003 | Husband et al. | ............... | 106/486 |
| 6,758,895 B2 | 7/2004 | Wesley | ........................ | 106/486 |
| 6,767,951 B2 * | 7/2004 | Nair et al. | ...................... | 524/445 |
| 6,808,559 B2 | 10/2004 | Golley et al. | .................. | 106/486 |
| 6,814,796 B2 | 11/2004 | Husband et al. | ............... | 106/486 |
| 7,044,836 B2 | 5/2006 | Sun et al. | .......................... | 451/41 |
| 7,078,453 B1 | 7/2006 | Feeney et al. | ................. | 524/493 |
| 7,119,138 B1 | 10/2006 | Feeney et al. | ................. | 524/450 |
| 7,189,407 B2 * | 3/2007 | Nishida et al. | ................. | 424/401 |
| 7,208,039 B2 | 4/2007 | Jones et al. | .................... | 106/486 |
| 7,214,264 B2 | 5/2007 | Jones et al. | .................... | 106/486 |
| 7,473,729 B2 | 1/2009 | Feeney et al. | ................. | 524/445 |
| 2004/0195182 A1 | 10/2004 | Elliot | ............................ | 210/681 |
| 2005/0131162 A1 | 6/2005 | Tanaka et al. | ........... | C08F 20/02 |
| 2005/0171250 A1 * | 8/2005 | Hayes | ............................. | 524/47 |
| 2005/0228104 A1 * | 10/2005 | Feeney et al. | ................. | 524/445 |
| 2006/0054263 A1 * | 3/2006 | Kamoshita | ........................ | 156/60 |
| 2006/0110615 A1 | 5/2006 | Karim et al. | ................... | 428/500 |
| 2007/0213446 A1 | 9/2007 | Feeney et al. | ................. | 524/445 |
| 2008/0131707 A1 | 6/2008 | Feeney et al. | ................. | 428/451 |
| 2009/0274918 A1 * | 11/2009 | Endo et al. | ................. | 428/476.3 |

FOREIGN PATENT DOCUMENTS

| | | | | |
|---|---|---|---|---|
| CA | 993738 | 7/1976 | .................... | 117/237 |
| EP | 608 877 | 6/1994 | ............. | C04B 14/20 |
| EP | 0 890 432 | 1/1999 | ............. | B32B 27/36 |
| JP | 2003-292713 | 10/2003 | ............. | C08L 33/02 |
| JP | 2005-125693 | 5/2005 | ............. | B32B 27/32 |
| WO | WO 99/10398 | 3/1999 | ............. | C08G 18/00 |
| WO | WO 2005/061608 | 7/2005 | ............... | C08K 9/00 |
| WO | WO 2006104257 A1 * | 10/2006 | | |
| WO | WO 2008/103123 | 8/2008 | ........... | C09D 105/14 |
| WO | WO 2009/114072 | 9/2009 | ............... | C08K 3/34 |
| WO | WO 2009/134538 | 11/2009 | ............. | B32B 27/20 |
| WO | WO 2010/039375 | 4/2010 | ................ | C08J 5/18 |

OTHER PUBLICATIONS

Lubrizol (Hycar 26288 Technical Data Sheet, Lubrizol Advanced Materials, Jun. 2007, 3 pages).*
International Preliminary Report on Patentability and Written Opinion.
Kenneth R. Barton, "Sulfopolyesters: New Resins for Water-Based Inks, Overprint Lacquers and Primers," American Ink Maker, pp. 70-72 (Oct. 1993); E. L. Cussler et al, J. Membrane Sci. 38:161-174 (1988); W. J. Ward et al, J. Membrane Sci., 55:173-180 (1991).
Chang, J. et al, Journal of Applied Polymer Science, vol. 84, 2294 (2002); Yano, K. et al, Journal of Polymer Science A: Polymer Chemistry, 35, 2289 (1997); Lan, T. et al, Chem. Mater. 6, 573 (1994).

* cited by examiner

*Primary Examiner* — Brieann R Fink
(74) *Attorney, Agent, or Firm* — Michael W. Ferrell

(57) ABSTRACT

A gas barrier film includes an anionically functionalized matrix resin and a platy mineral filler. The formed film is surface-treated with a multi-valent metal cation crosslinking agent to stabilize the barrier film against performance loss at elevated levels of relative humidity.

24 Claims, No Drawings

BARRIER COATINGS POST-FORMATION TREATED WITH MULTI-VALENT METAL CATIONS

CLAIM FOR PRIORITY

This non-provisional application claims the benefit of International Patent Application No. PCT/US2010/001285 (International Publication No. WO 2010/129032), filed on 30 Apr. 2010 and entitled "Barrier Coatings Post-Treated with Multi-Valent Metal Cations". This non-provisional application also claims the benefit of the filing date of U.S. Provisional Patent Application Ser. No. 61/215,516, of the same title, filed May 6, 2009. The priorities of International Patent Application No. PCT/US2010/001285 and U.S. Provisional Patent Application Ser. No. 61/215,516 are hereby claimed and their disclosures thereof are incorporated into this application by reference.

FIELD OF INVENTION

The present invention relates to composite barrier coatings, and particularly to coatings with an anionic ionomer functionalized matrix resin which coatings have been post-treated with a multi-valent metal salt or suitable metal cation complex. The treated films are stabilized against performance loss when exposed to elevated levels of relative humidity.

BACKGROUND OF INVENTION

Barrier coatings (layers) which prevent, reduce, or inhibit the permeation of a selected substrate with a gas, vapor, chemical and/or aroma have been widely described, and such coatings are used in a variety of industries, e.g., the packaging industries, automobile industries, paint industries, tire industries etc. Typical barrier materials used in coatings include polyesters, PVDC, polyurethanes, acrylic polymers, etc.

It is well known that the barrier properties of a polymer can be improved by the addition of impermeable plate like structures such as kaolin, vermiculite, montmorillonite and so forth. When the plates are oriented perpendicular to the diffusion (permeation) direction, the diffusing molecules must go around the plates. This leads to significant reductions in the permeability of the polymer. See, for example, E. L. Cussler et al, *J. Membrane Sci.* 38:161-174 (1988); W. J. Ward et al, *J. Membrane Sci.*, 55:173-180 (1991); Chang, J. et al, *Journal of Applied Polymer Science*, Vol. 84, 2294 (2002); Yano, K. et al, *Journal of Polymer Science A: Polymer Chemistry*, 35, 2289 (1997); Lan, T. et al, *Chem. Mater.* 6, 573 (1994); Messersmith, P. B. and Giannelis, E. P, *Journal of Polymer Science A: Polymer Chemistry* 33, 1047 (1995); U.S. Pat. Nos. 4,528,235; 4,536,425; 4,911,218; 4,960,639; 4,983,432; 5,091,467; and 5,049,609; and International Patent Application No. WO93/04118, published Mar. 4, 1993, among others.

Some particularly preferred nanocomposite gas barrier coatings are disclosed in the following: U.S. Pat. No. 7,078,453, entitled "Barrier Coating of a Non-Butyl Elastomer and a Dispersed Layered Filler in a Liquid Carrier and Coated Articles", to Feeney et al.; U.S. Pat. No. 7,119,138, entitled "Barrier Coating of a Mixture of Cured and Uncured Elastomeric Polymers and a Dispersed Layered Filler in a Liquid Carrier and Coated Articles", to Feeney et al.; and U.S. Pat. No. 7,473,729, entitled "Barrier Coating Mixtures Containing Non-Elastomeric Acrylic Polymer with Silicate Filler and Coated Articles", to Feeney et al., as well as copending United States Patent Applications Publication Nos. US 2007/0213446, entitled "Barrier Coating of a Non-Elastomeric Polymer and a Dispersed Layered Filler in a Liquid Carrier and Coated Articles", of Feeney et al.; US 2008/0131707, entitled "Concentrated Aqueous Nanocomposite Dispersions for Barrier Coatings", of Feeney et al.; and US 2006/0110615, entitled "Multilayer Nanocomposite Barrier Structures", of Karim et al., the disclosures of which are incorporated herein by reference.

Despite many advances in the art, composite barrier coatings tend to exhibit performance degradation due to elevated relative humidity. The present invention provides coatings which resist such performance degradation upon exposure to elevated levels of relative humidity.

SUMMARY OF THE INVENTION

In accordance with the invention, a method of preparing a stabilized gas barrier film includes: preparing an aqueous barrier composition with: (i) water; (ii) an anionically functionalized matrix resin; (iii) a platy mineral filler; and (iv) optionally, one or more of an additive selected from the group consisting of surfactants, emulsifiers, anti-foaming agents, dispersing agents, wetting agents, leveling agents and thickeners. The anionically functionalized matrix resin, the platy mineral filler and optional additives are selected such that the barrier coating composition forms a stable aqueous emulsion. The aqueous barrier composition is applied to a substrate and dried to a barrier film, whereupon the film is post-treated with a multi-valent metal crosslinking agent which is operative to stabilize the barrier film against barrier performance loss at elevated levels of relative humidity.

Other aspects and advantages of the present invention are described in the detailed description below and in the claims.

DETAILED DESCRIPTION OF THE INVENTION

The invention is described in detail below with reference to numerous embodiments for purposes of exemplification and illustration only. Modifications to particular embodiments within the spirit and scope of the present invention, set forth in the appended claims, will be readily apparent to those of skill in the art.

Unless more specifically defined below, terminology as used herein is given its ordinary meaning.

As used herein, percent (%) and like terms refer to weight percent unless otherwise indicated.

I. DEFINITIONS

The term "aspect ratio" is defined as a characteristic of every platelet material in solid form. Aspect ratio is the product of the lateral dimension of a platelet filler particle, e.g., mica flake, divided by the thickness of the platelet. "High aspect ratio" refers to a platelet filler whose lateral dimension divided by thickness is greater than 25. The aspect ratio of any filler is an inherent property of the selected filler. For example, MICROLITE® 963 aqueous vermiculite solution [W. R. Grace, See EP Application No. 601,877, published Jun. 15, 1994] has a characteristic aspect ratio of about 10,000 or dimensions of 10-30 μm×10 Å.

A "barrier coating mixture" or "aqueous barrier composition" includes a liquid containing suspended solids, which is used to apply the solids to a substrate. The barrier coating mixtures provide a dispersion of platelet fillers in liquid at an unusually low solids content, e.g., between about 1 to about 30% solids as described in more detail below. According to this invention, once the "coating mixture" is dried, it is referred to as a "dried coating" or a "film".

"Exfoliation" is defined for layered fillers as the complete separation of individual layers of the original particle, so that the polymer completely surrounds each particle. Desirably, a sufficient amount of polymer is present between each platelet, so that the platelets are randomly spaced. No X-ray line appears because of the random spacing of exfoliated platelets. In some circumstances, the filler can exfoliate when dispersed in an aqueous or non-aqueous medium. This would result in a higher aspect ratio than that of a solid particle before dispersion.

The term "gas barrier" includes a barrier to oxygen, nitrogen, carbon dioxide and other gases.

"Mesoscopic domains" means that the plates form locally oriented domains where the platelets are well aligned. Macroscopic domains can be seen when suspensions of particles forming mesoscopic domains are viewed through cross polarizers. These domains become difficult to see when polymer is dispersed in the water.

The term "mixture" or "coating mixture" is interpreted to include a colloidal dispersion, suspension, emulsion and latex as they are conventionally defined. For example, by "colloidal dispersion or latex" is meant any dispersion or suspension of particles in liquid, the particles being of a size greater than molecular scale, e.g., about 0.001 to about 0.1 micron. An emulsion generally contains particles of about 0.05 to 1.0 microns, in liquid. A "suspension" generally contains particles of greater than 1.0 micron in liquid.

The term "nanocomposite" or "filled polymer nanocomposite" refers to the mixture of substantially exfoliated filler and polymer. The degree of exfoliation of the filler in the polymer is not specified. The thickness of at least some filler particles is below 1 micron, and probably well below 100 nm.

As used herein, "non-elastomeric polymer" includes those polymeric materials with glass transition temperatures ($T_g$) above room temperature and/or with crystallinity above 10%. Typically, non-elastomeric polymers can be viewed as polymers that even when properly crosslinked and not filled with inorganic fillers cannot be stretched at room temperature to twice their length and then return to their original shape. This definition refers to the properties of the polymer, and not to the filled or final nanocomposite coating.

The term "substrate" or "article" coated by these coatings includes, without limitation, materials such as films, particularly packaging films (including antiseptic, corrosion protective, vacuum and controlled atmosphere packages), blow molded or thermoformed containers and articles for food processing and medical uses, electronic displays and other surfaces, and the like.

II. THE BARRIER COATING

An aqueous barrier coating composition according to this invention typically includes the following components:
(a) water;
(b) an anionically functionalized matrix resin;
(c) a platy mineral filler; and
(d) optionally, one or more of an additive selected from the group consisting of surfactants, emulsifiers, anti-foaming agents, dispersing agents, wetting agents, leveling agents and thickeners;
wherein the anionically functionalized matrix resin and the platy mineral filler and optional additives are selected such that the barrier coating composition forms a stable aqueous emulsion. A multi-valent metal cation crosslinking agent is applied to a dried film and is operative to stabilize a film formed from the composition against gas barrier performance loss at elevated levels of relative humidity.

A. The Anionically Functionalized Matrix Resin

The matrix resin utilized in connection with the barrier composites of the invention are water emulsifiable, anionically functionalized polymers, sometimes referred to as water emusifiable ionomers. Water-emulsifiable, emusifiable and like terminology refers to a polymer that forms a stable, oil-in-water emulsion at 25° C. The ionomers are typically copolymers. Preferably, the matrix resin comprises anionic repeating units or grafted functionality containing salts of carboxylic acid, sulfonic acid, or phosphonic acid functional groups, or combinations thereof. Suitable ionomers include anionic repeating units selected from the group consisting of salts of acrylic acid, methacrylic acid, itaconic acid, maleic acid, maleic anhydride, vinyl sulfonic acid, 2-methacryloyloxy-ethanesulfonate, styrenesulfonic acid, 2-acrylamido-2-methylpropane sulfonic acid (AMPS), vinylphosphonic acid, 2-(methacryloyloxy)ethylphosphate and combinations thereof as are described in U.S. Pat. No. 7,044,836 to Sun et al., the disclosure of which is incorporated herein by reference.

The anionically functionalized matrix resin thus typically includes a base resin (polymer chain) functionalized with anionic groups in the backbone or grafted to the backbone of the polymer. The base resin of the matrix resin may include any suitable polymer, such as polyacrylates, polyamides, polyimides, poly(meth)acrylate, polystyrene, copolystyrene-copoly(meth)acrylate, polyester, mixtures thereof and the like. A preferred base resin of the water emulsifiable polymer resin comprises polyester.

Anionic groups included with the base resin to provide the ionomer anionic functionality include, but are not limited to, carboxylic acid alkali salts, phosphonate salts, ammonium halides, alkali sulfonated groups, mixtures thereof and the like. Preferably, the anionic group attached to the base resin polymer chain is an alkali sulfonated group with an alkali metal counterion such as sodium, calcium, lithium, potassium, cesium, barium, magnesium, hydrogen, mixtures thereof and the like.

In some preferred embodiments of the present invention, the emulsifiable polymer resin may be a polyester derived from a diol and a diester. In a preferred emulsifiable polymer resin, the resin comprises about 50 mole percent of a diol such as an alkylene glycol or oxyalkylene glycol, and about 50 mole percent of a diester. The diester component in the preferred emulsifiable polymer resin is preferably a mixture of from about 1 to about 15 mole percent of a sulfonated aromatic moiety, preferably a sodium sulfonated aromatic moiety, such as dimethyl 5-sulfoisophthalate sodium salt, and the remaining portion is from about 35 to about 47.5 mole percent of a diester such as dimethyl terephthalate, dimethyl naphthalenedicarboxylate, dimethyl isophthalate, mixtures thereof and the like. Such an emulsifiable polymer resin of this embodiment has repeating units of the following general formula:

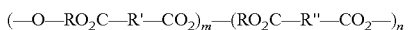

wherein R' is phenylene, ethenylene, terephthalylene, isophthalylene, bisphenolene, bis(alkyloxy)bisphenolene, cyclohexylene, an alkylene group or the like; R" is an alkali sulfonate derivative of phenylene, ethenylene, terephthalylene, isophthalylene, bisphenolene, bis(alkyloxy)bisphenolene, cyclohexylene, alkylene group, mixtures thereof, derivatives thereof and the like; R is an alkyl group or an oxyalkylene group; and n and m represent the random segments of the polymer and are integers of from 1 to about 300 each. The molecular weight of said emulsifiable resin may be from about 500 to about 50,000 and preferably from about 1,000 to about 20,000. More preferably, the molecular weight is from about 1,000 to about 5,000. Additional suitable emulsifiable polyester resins are described, for example, in U.S. Pat. No. 5,348,832, the entire disclosure of which is incorporated herein by reference.

Suitable water-emusifiable anionic polyesters or other suitable ionomers may generally have a charge density of from 0.1 meq/g polymer solids to 1 meq/g polymer solids; typically having a charge density of from 0.2 meq/g polymer solids to 1 meq/g polymer solids and preferably having a charge density of from 0.3 meq/g polymer solids to 1 meq/g polymer solids.

Various methods for producing such emulsifiable, ionic polymer resins are known in the art, and will be apparent to one skilled in the art based on the instant disclosure. For example, sulfonated polyester resins are available from Eastman Chemical Company, as the Sulfopolyester Series 1000, 1100, 1200 and 2100 as well as 38S, 38D, 48, and 55S products with a Tg of from about 30° to 65° C.

Such sulfopolyester resins, and the method for production thereof, are described, for example, in Kenneth R. Barton, "Sulfopolyesters: New Resins for Water-Based Inks, Overprint Lacquers and Primers," American Ink Maker, pp. 70-72 (October, 1993), the entire disclosure of which is incorporated herein by reference. The disclosed process may be adjusted as necessary, in accordance with the present invention, to provide suitable emulsifiable polyester ionomer resins.

In many cases, non-elastomeric matrix resins are used which include a non-elastomeric polymer as the base resin which is provided with ionic functionality as noted above. Non-elastomeric polymers include polymers selected generally from among many classes. Such polymers include, without limitation, polyesters, polyester containing polymers, polyamides, as is noted above, as well as chlorinated polymers, polyolefins, polyurethanes, polyethers, polyketones, polycarbonates, acrylics, vinylics and fluoropolymers.

PVDC containing base resins used in connection with this invention include the homopolymer of PVDC and its copolymers and blends. Particularly preferred copolymers include those with polyvinyl chloride (PVC) and chlorinated PVC (CPVC). Other copolymers are those containing any moiety derived from copolymerization with an active double bond such as an alkene, haloalkene or any of the acrylic containing monomers. Suitable examples include alkenes such as ethylene and vinyl acetate and acrylics such as the alkyl esters of acrylic or methacrylic acids.

Suitable polyolefin base resins include material made by polymerizing such olefins as ethylene, propylene, butene-1, pentene-1,4-methylpent-1-ene, etc., in conventional manner.

Useful polyolefins are high-density polyethylene (HDPE) and polypropylene. Other polyolefin homopolymers and copolymers of ethylene can be utilized in the practice of this invention. Such other polyolefins include low-density polyethylene (LDPE), very low-density polyethylene (VLDPE), linear low-density polyethylene (LLDPE) and polybutylene (PB). However, these other polyolefins can be blended with other polyolefins such as polypropylene or high-density polyethylene (HDPE).

Polyamide resins useful in the practice of the invention are well-known in the art and include semi-crystalline and amorphous resins, which may be produced for example by condensation polymerization of equimolar amounts of saturated dicarboxylic acids containing from 4 to 12 carbon atoms with diamines, by ring opening polymerization of lactams, or by copolymerization of polyamides with other components, e.g. to form polyether polyamide block copolymers. Examples of polyamides include polyhexamethylene adipamide (nylon 66), polyhexamethylene azelamide (nylon 69), polyhexamethylene sebacamide (nylon 610), polyhexamethylene dodecanoamide (nylon 612), polydodecamethylene dodecanoamide (nylon 1212), polycaprolactam (nylon 6), polylauric lactam, poly-11-aminoundecanoic acid, and copolymers of adipic acid, isophthalic acid, and hexamethylene diamine.

Other suitable non-elastomeric polymers include aliphatic polyethers such as poly(alkylene oxides), including poly(ethylene oxide) and poly(propylene oxide) and aromatic polyethers such as poly(2,6-dimethyl-1,4-phenylene oxide) and phenylene ether copolymers formed from 2,6-dimethylphenol and 2,3,6-trimethylphenol. Polyphenylene sulfide can also be used as well as polysulfones formed from diaryl sulfones and polyethersulfones formed from the diaryl sulfone group in combination with an ether such as bisphenol A.

Still other non-elastomeric polymers include polycarbonates, such as those prepared from bisphenol A and similar materials; polyketones (including polyetherketones and polyetheretherketones), such as PEEK®; acrylic polymers and copolymers, such as poly(alkyl methacrylates); polyurethanes; and vinyl polymers and copolymers derived from moieties such as polystyrene, polyacrylonitrile and polyvinyl acetate; vinyl acetate copolymers, such as ethylene/vinyl acetate; and polyacrylamide polymers and copolymers.

Still more non-elastomeric polymers include fluoropolymers such as polytetrafluoroethylene (PTFE), fluorinated ethylene-propylene (FEP), polyvinylidene fluoride (PVDF), poly ethylene-tetrafluoroethylene (E-TFE), poly ethylene-chlorotrifluoroethylene (E-CTFE), polyvinyl fluoride (PVF), poly chlorotrifluoroethylene-vinylidene fluoride (CTFE-VDF), polychlorotrifluoro-ethylene (PCTFE), tetrafluoroethylene/hexafluoropropylene/vinylidene fluoride (THV) and amorphous fluoropolymers.

Details concerning coatings are found in U.S. Pat. No. 7,078,453, entitled "Barrier Coating of a Non-Butyl Elastomer and a Dispersed Layered Filler in a Liquid Carrier and Coated Articles", to Feeney et al.; U.S. Pat. No. 7,119,138, entitled "Barrier Coating of a Mixture of Cured and Uncured Elastomeric Polymers and a Dispersed Layered Filler in a Liquid Carrier and Coated Articles", to Feeney et al.; and U.S. Pat. No. 7,473,729, entitled "Barrier Coating Mixtures Containing Non-Elastomeric Acrylic Polymer with Silicate Filler and Coated Articles", to Feeney et al., as well as copending United States Patent Applications Publication Nos. US 2007/0213446, entitled "Barrier Coating of a Non-Elastomeric Polymer and a Dispersed Layered Filler in a Liquid Carrier and Coated Articles", of Feeney et al.; US 2008/0131707, entitled "Concentrated Aqueous Nanocomposite Dispersions for Barrier Coatings", of Feeney et al.; and US 2006/0110615, entitled "Multilayer Nanocomposite Barrier Structures", of Karim et al., the disclosures of which are incorporated herein by reference.

B. The Platy Mineral Filler

The barrier coating mixtures of this invention as described above also include a dispersed layered filler which has an inherently high aspect ratio, which can range from about 25 to as high as about 30,000. Preferred fillers include montmorillonite, vermiculite and platy kaolins. More particularly, a desirable vermiculite is MICROLITE® 963 water-based vermiculite dispersion (W. R. Grace) [See, EP Application No. 601,877, published Jun. 15, 1994] which is a 7.5% by weight aqueous solution of dispersed mica.

Examples of filler include exfoliated silicates, for example, bentonite, vermiculite, montmorillonite, nontronite, beidellite, volkonskoite, hectorite, saponite, laponite, sauconite, magadiite, kenyaite, ledikite and mixtures thereof. Montmorillonite or MICROLITE® vermiculite is a preferred filler because of its very high aspect ratio. The vermiculite plates have an average lateral size of between 10 and 30 microns. The plates are largely exfoliated in water, and thus their thickness is 1-3 nm. The aspect ratio of the filler in water dispersion is an average of 10,000-30,000. It is clear that many plates reassemble during the coating and drying process of the present invention. However, it is a great advantage to start with as large an aspect ratio as possible. The selection and use of other known silicates which have properties similar to those of MICROLITE® vermiculite, as well as sufficiently high aspect ratios, are expected to be obvious to one of skill in the art following the teachings of this invention.

Large aspect ratio platelets in the filler can be locally oriented. The mesoscopic nature of the suspended plates is a direct consequence of the aspect ratio. A simple demonstration of the large aspect ratio of MICROLITE® 963 is the fact that oriented macroscopic domains can be observed when it is dispersed in water at a concentration of 0.02% by weight, or 0.01% by volume. The concentration above which a platelet filler will be locally oriented in suspension is given approximately by 1 aspect ratio. Thus fillers that start with an aspect ratio of 25 would have to be deployed above 4% by volume in a dispersion to achieve high local orientation.

Although MICROLITE® 963 vermiculite (W. R. Grace) is preferred, good results may also be achieved with other exfoliated grades of MICROLITE® vermiculite (i.e., grades 963++, 923, and 903). Other layered silicates are also useful in the barrier coatings and films of this invention. In particular are SOMASIF™ ME-100 from CO—OP Chemical co. Ltd. (Tokyo, Japan) and SCPX-2041 from Southern Filler Products (Gonzales, Tex.). The effectiveness of other silicates in the barrier coating of this invention depends upon the lateral size of the platelets, the degree of exfoliation in water, and the degree to which they reassemble to form larger particles during the coating and drying process.

Hyperplaty kaolin that is suitable for use in connection with this invention is described in U.S. Pat. Nos. 6,758,895; 7,208,039; 7,214,264 and 7,226,005, all of which are incorporated herein by reference in their entirety. Platy kaolin that is particularly suitable for use in the composition of this invention is described in U.S. Pat. Nos. 6,616,749; 6,814,796; 6,537,363; 6,610,137; 6,564,199; and 6,808,559, all of which are incorporated herein by reference in their entirety. Briefly, a high shape factor may be achieved by grinding mined kaolinitic clays until the desired shape factor is achieved. Any art recognized grinding method can be used with the present invention including but not limited to, for example, wet grinding using sand or ceramic media. For example, the kaolin may be prepared by light comminution, e.g., grinding or milling, of a coarse kaolin to give suitable delamination thereof. The comminution may be carried out by use of beads or granules of a ceramic or plastic, e.g., nylon, grinding or milling aid. Appropriate grinding energies will be readily apparent and easily calculated by the skilled artisan. Significant grinding energies may be necessary to attain desirable high shape factors, however kaolin crude selected for its natural platyness will grind to high shape factors in an energy range typically used to manufacture standard delaminated kaolin pigments that have lesser shape factors.

Crude kaolin or a high shape factor product obtained from grinding or milling may be refined to remove impurities and improve physical properties using well known procedures generally referred to as beneficiation processes. The kaolin may be treated by a known particle size classification procedure, screening and/or centrifuging, to obtain particles having a desired particle size distribution and $d_{50}$ value (as discussed above). Preferably, mined clays are suitably first degritted before they are subjected to grinding to achieve the desired shape factor.

A barrier coating can include a pre-treatment of kaolin or an exfoliated silicate filler with acid or base; that is, prior to mixing the dispersed filler with a dispersed polymer. While there is not yet a full understanding of the mechanism that takes place between the acid or base and the filler particles, the key reasons to use such a treatment include:

1. Improved compatibility of the aqueous polymer dispersion and the aqueous dispersed filler. This is still quite different from other work aimed at improving the compatibility of the polymer and the filler. Organic groups are not being put on the flat surface to the filler in any significant amount (because those groups are negatively charged and wouldn't stick to that surface).
2. Improved stability of the coating formulation.

In both cases, the acid or base treatment can modify the detailed interaction among filler particles, and between the filler and the polymer dispersed in the water. It may also modify the interaction with surfactants and thickeners. Although these interactions are not fully understood, the improvements observed probably arise from one or both of the following mechanisms:

a) Chemical modification of the filler—i.e., the attachment of acid or base groups to the edges or at defects in the filler structure. In addition, the treatment may remove metal ions from the filler, further changing its interaction with charged surfactants and other components in the formulation.
b) Physical changes in the plate structure: If the acid or base treatment locally modifies the filler at defects and or impurities, it may cause the plates to bend. If the plates are not flat, they will have regions where they are in contact. On the other hand, they cannot fully agglomerate into larger filler particles when they are not flat. These types of physical changes are consistent with observation of changes in viscosity and stability when the filler is treated. Physical changes such as those described are also consistent with the fact that the changes are not reversible when an acid treated filler is subsequently treated with a base. If physical changes are critical to improved properties, such changes may be achieved by methods other than acid or base treatment.

C. Surfactants and Other Additives

Coating mixtures of this invention can also contain at least one or more than one suitable surfactant to reduce surface tension. Surfactants include materials otherwise known as wetting agents, anti-foaming agents, emulsifiers, dispersing agents, leveling agents etc. Surfactants can be anionic, cationic and nonionic, and many surfactants of each type are available commercially. A suitable surfactant for inclusion in these compositions possesses a critical micelle concentration sufficiently low to ensure a dried coating uncompromised by residual surfactant. Preferably, the surfactant(s) useful in the methods and dispersions of this invention are nonionic, particularly useful with a highly charged filler, such as vermiculite. In the event of an unfavorable interaction of the anionic emulsifier present in the latex dispersion, any additional ionic additives must be kept to a minimum. This variable is eliminated where the surfactant or emulsifier is non-ionic. Increase in ionic concentration of the compositions containing vermiculite, such as by the addition of a base to adjust pH, e.g., KOH, NH₄OH and NaOH can cause agglomeration of the filler, which adversely affects permeability reduction.

Cationic surfactants that can ion exchange with the alkali metal counterions present in the layered silicates have not been used. They will typically make the filler surface hydrophobic, and thus make a stable water suspension impossible. Limited quantities of cationic surfactants may be included as long as they don't adversely affect the coating formulation stability.

Desirable surfactants employed in the examples below are the non-ionic siloxane-based, SILWET® L-77 wetting agent [OSI Specialties, Inc.], and FOAMASTER® VL defoamer (Henkel), among others.

Other suitable surfactants may also be selected. The amount and number of surfactants added to the coating dispersion or composition will depend on the particular surfactant(s) selected, but should be limited to the minimum amount of surfactant that is necessary to achieve wetting of the substrate while not compromising the performance of the dried coating. For example, typical surfactant amounts can be less than or equal to about 15% by weight of the dried coating.

Alternatively, the same surfactant molecule can be chemically bonded to the polymer as 1) a copolymer moiety or 2) an added reactive moiety that can later react with the polymer.

Other optional components of the coating mixture include conventional agents to adjust pH, such as bases, for example, NH₄OH, NaOH or KOH, among others; or acids, for example, acetic acid, glycine or citric acid, among others provided that care is taken to avoid agglomeration, as discussed above.

In another embodiment, thickeners may be used in the coating formulations to adjust viscosity. One of skill in the art would readily determine and adjust the type and amounts of thickener depending on the type and amount of filler employed in the coating mixture based on the teachings contained herein.

When a film or coating limits the diffusion of any molecule or chemical, it is well known that the penetration of the said molecule can be further reduced by the addition of absorbers or getters to either the coating, or in a layer or material below the coating. This concept is used commercially in Honeywell's AEGIS™ Nylon films to block the diffusion of oxygen. It is clear that the same concept can be used in conjunction with nanocomposite coatings to block the penetration of oxygen, water, chemical warfare agents, or any other material. The use of such absorbers will not have a large effect on the steady state permeability, but it will primarily affect the time it takes for the first molecules to diffuse through the system. This breakthrough time is most important in packaging, chemical protective, and electronic applications.

The additives described above may be supplemented with a suitable plasticizer, such as propylene glycol, dipropylene glycol, glycerin, ethoxydiglycol, triacetin, triethyl citrate, dioctyl sulfosuccinate, and selected dimethicone copolyols. Other materials that may be added include corn oil, citronella oil, olive oil, coconut oil, fragrances, dimethicone, cyclomethicone, paraffin wax, and pigments as desired.

D. The Carrier Liquid

The coating mixtures utilized in connection with this invention are typically present in a suitable carrier liquid that is predominantly water. Combinations of water with an organic carrier may also be used as the carrier liquid. Examples of suitable organic carriers could include hexane, heptane, toluene, isopropyl alcohol, cyclohexanone, ethanol, methanol, other hydrocarbons, and combinations thereof. Selection of a suitable organic solvent carrier is within the skill of the art.

III. METHODS OF COATING A SUBSTRATE OR FORMING A FILM

The articles to be coated by the compositions of the invention may be previously untreated or may have a variety of pre-treatments to their surfaces, depending upon the identity and utility of the article. For example, the article may have on at least one side a heat seal layer. Such heat seal layers may be made of an ethylene-propylene copolymer or ethylene-propylene-butylene terpolymer. Thus, the coating dispersion is applied on the surface of the heat seal layer. Alternatively, the substrate or article may comprise a protective topcoat layer, such as polyurethane or fluoropolymers such as TEFLON®-type materials [DuPont] for abrasion resistance, etc. Such topcoats may be selected by one of skill in the art. The coatings of this invention may be applied over or under the topcoat layer.

Alternatively, the coating mixtures of the invention may be applied to a releasable mold in order to form a film, rather than a coated article. The film thus consists of a dried mixture of the above-described polymer and greater than 5% by weight of the layered filler having an aspect ratio greater than 25. The film, which may be in the form of a membrane, may itself be employed as a gas barrier layer for use in various laboratory procedures, or as a glove or balloon material.

To form the coated article or free-standing film of this invention, the coating mixtures of this invention may be applied to the selected surface or article by techniques including, without limitation, roll coating, spray coating, brush coating and dip coating techniques. Roll coating techniques include, but are not limited to, rod, reverse roll, forward roll, air knife, knife over roll, blade, gravure and slot die coating methods. General descriptions of these types of coating methods may be found in texts, such as Modern Coating and Drying Techniques, (E. Cohen and E. Gutoff, eds; VCH Publishers) New York (1992) and Web Processing and Converting Technology and Equipment, (D. Satas, ed; Van Nostrand Reinhold) New York (1984). Three dimensional articles may preferably be coated by the techniques which include, but are not limited to, spray coating or dip coating. The method of application is not a limitation on the present invention, but may be selected from among these and other well-known methods by the person of skill in the art. However, the coating must be applied so that drying takes place on the substrate and not in the air (i.e. powder coating). If drying takes place during spraying or other means of application, agglomeration may occur.

The coating mixtures may be applied to a substrate or a mold at any desired thickness, depending on the substrate, the purpose for which the coating is being applied and the ultimate use of the coated article. Thus, for example, the coating mixtures of the present invention may be applied to an article or substrate by the methods described above to form a dried coating of a thickness between about 0.1 μm to about 200 μm of dry coating. Such adjustments are well within the skill of the art [See, e.g., Canadian Patent No. 993,738].

After coating, the coated article or mold may be dried at a selected temperature, e.g., room temperature or greater than room temperature. The selection of the drying temperature, relative humidity, and convective air flow rates depends on the desired time for drying; that is, reduced drying times may be achieved at elevated air temperatures, lower relative humidity and higher rates of air circulation over the drying coating surface. One of skill in the art can readily adjust the drying conditions as desired.

IV. MULTI-VALENT METAL CATION CROSSLINKING AGENTS

The formed film is post-treated with a multi-valent metal cation crosslinking agent to improve performance at elevated relative humidity. Metal cations with a valency of at least 2 and preferably 3 or more, and in some cases 4 or more may be used as crosslinking agents. Exemplary cations are cations of aluminum, zirconium, iron, chromium, titanium etc. Aluminum has been found to be a particularly useful crosslinking agent. Mixtures of cations, for example, mixtures of zirconium and aluminum ions may be effective in providing crosslinking of complex polymers containing more than one type of ionomer functional group. The crosslinker will usually be added to the film in the form of an aqueous salt or an aqueous water-soluble "complex" which provides cations upon dissolution in water. An example of a preferred salt is aluminum potassium sulfate dodecahydrate. An example of one type of complex for adding the metal cation crosslinking agent may be ammonium zirconium carbonate. A salt solution according to the invention may preferably have a concentration of less than about 10% by weight.

Other metal cations, or mixtures of cations, may be employed. A metal having a valence of two or more may be selected from the group consisting of suitable transition metals, lanthanides, actinides, and metals in Periodic Table groups 2A, 2B, 3A, 4A, and 5A, for example. Divalent cations, such as alkaline earth cations such as calcium cations and so forth may be employed; however, care must be taken to avoid conditions which may result in agglomeration, likewise with group 2B metals such as zinc. Suitable transition metal cations may include cations of titanium, zirconium, chromium, and so forth. Metals in Periodic Table groups 2B, 3A, 4A, and 5A include zinc, cadmium, mercury, aluminum, gallium, indium, thallium, tin, lead, and bismuth. Preferably, the metal selected is aluminum, zirconium or titanium.

V. BARRIER PERFORMANCE MEASUREMENTS

The evaluation of permeability of the coatings of the present invention is determined using the following parameters. The oxygen transmission rate (OTR) of the dried coating on the article, or the free-standing film, is generally measured using conventional apparatus, such as a Mocon OX-TRAN® 2/20 module. OTR units are cc/m² day at 1 atmosphere, 0% relative humidity at 23° C. The permeability of the coating is calculated by multiplying the OTR and coating thickness. Permeability units are cc mm/m² day atmosphere at 0% relative humidity at 23° C. If the coating is on a known substrate, the permeability of the known substrate is subtracted out using the following equation:

$$\text{Permeability of the barrier coating} = X_1/[(1/\text{OTR}) - (X_2/P_{X2})]$$

where $X_1$ is barrier coating thickness; $X_2$ is substrate thickness and $P_{X2}$ is permeability of the substrate. The reduction in permeability from the untreated polymer is calculated by dividing the permeability of the untreated polymer by the permeability of the treated polymer at the same relative humidity. Reduction in permeability is a unitless ratio.

Examples

Experimental Procedures a) Oxygen Transmission Rate Testing

Films and coated substrates are tested for oxygen transmission rate using a Mocon OX-TRAN® 2/20 or 2/60 module, or an Illinois Instrument 8001 or 8011 oxygen permeation analyzer, at 23° C. and initially at 0% RH. The samples are loaded onto the modules and conditioned for 2 hours prior to testing for oxygen. Once equilibrium is reached, an OTR (oxygen transmission rate) is reported in units of cc/m² day atm.

b) Thickness Measurements

The thickness of the coating on a substrate is measured after the OTR is reported. The film is scratched, and optical profilometry is used to determine the surface thickness. The thickness of the film is reported in microns and used to calculate the permeability of the film.

c) Permeability Calculations

Permeability is calculated using the thickness of the film and the OTR of the sample in the following equation:

$$\text{Coating Permeability} = (\text{coating thickness})/[(1/\text{OTR}) - (\text{substrate thickness/substrate permeability})]$$

The benefit of obtaining the permeability of the coating versus the OTR of the sample is that permeability reports the OTR at a specified thickness. Therefore, different coatings can be compared directly. This is important when determining the performance of a coating on varying substrates and at different thickness.

d) Treated Filler Procedures

The MICROLITE® exfoliated silicate (W. R. Grace, 7.5%) may be treated with acid or base using the following procedures A-D:

A. 18% Acid or Base by Weight of Filler (w/w)

Into a 2 liter plastic jar with a lid is weighed 600 μrams of MICROLITE® 963. To this dispersed silicate filler 8.3 rams of acid or base (100% concentrated) in 303 grams of distilled water is added. The resulting dispersion is mixed for a pre-determined amount of time in the closed container at room temperature. After the determined amount of time, the treated filler is used immediately.

B. 2% Acid or Base by Weight of Filler (w/w)

Into a 2 liter plastic jar with a lid is weighed 600 grams of MICROLITE® 963. To this dispersed silicate filler, 0.9 grams of acid or base (100% concentrated) in 310 grams of distilled water is added. The resulting dispersion is mixed for a pre-determined amount of time in the closed container at room temperature. After the determined amount of time, the treated filler is used immediately.

C. 61% Acid or Base by Weight of Filler (w/w)

Into a 2 liter plastic jar with a lid is weighed 600 grams of MICROLITE® 963. To this dispersed silicate filler, 27.3 grams of acid or base (100% concentrated) in 283.7 grams of distilled water is added. The resulting dispersion is mixed for a pre-determined amount of time in the closed container at room temperature. After the determined amount of time, the treated filler is used immediately.

D. 100% Acid or Base by Weight of Filler (w/w)

Into a 2 liter plastic jar with a lid is weighed 600 grams of MICROLITE® 963. To this dispersed silicate filler, 45.5 grams of acid or base (100% concentrated) in 265.5 grams of distilled water is added. The resulting dispersion is mixed for a pre-determined amount of time in the closed container at room temperature. After the determined amount of time, the treated filler is used immediately.

e) Sample Preparation Treatment Methods

Examples 1-13 were conducted using a Nanolok™ PT sulfopolyester emulsion containing an EASTEK® 1000 or 1200 polymer and a montmorillonite filler, optionally stabilized with polyvinylpyrollidone. Examples 14-35 similarly used a Nanolok™ PT sulfopolyester emulsion, but contained a vermiculite filler. This class of barrier coatings is described in detail in one or more of: U.S. Pat. No. 7,473,729, entitled "Barrier Coating Mixtures Containing Non-Elastomeric Acrylic Polymer with Silicate Filler and Coated Articles", to Feeney et al., as well as copending United States Patent Applications Publication Nos. US 2007/0213446, entitled "Barrier Coating of a Non-Elastomeric Polymer and a Dispersed Layered Filler in a Liquid Carrier and Coated Articles", of Feeney et al.; US 2008/0131707, entitled "Concentrated Aqueous Nanocomposite Dispersions for Barrier Coatings", of Feeney et al.; and US 2006/0110615, entitled "Multilayer Nanocomposite Barrier Structures", of Karim et al., the disclosures of which are incorporated herein by reference.

The substrate and conditions as well as results for each example are provided in Tables 1 and 2. The filler content ranged from 35% of the solids content to 60% of the solids content. The solids content ranged from 5.0% to 8.0% in water. In some cases, suitable surfactants known to one of skill in the art were added. A comparative example was performed for each barrier coating formulation, wherein the film was not treated with a crosslinking agent. The remaining samples were treated according to one of the twelve methods listed below. In each method, aluminum potassium sulfate dodecahydrate (98+%, available from Acros® Organics) was applied as a salt bath to the formulation with a selected concentration, application time, rinse time, and drying method. Salt concentrations over 9 wt % caused a clumping response. Without being bound by theory, this response is believed to occur because water present in the salt bath causes the polymer to swell and exposes the filler to agglomeration. Except where otherwise noted, each sample was hand-dipped for less than 5 seconds. That is, the dried barrier film was treated with the multi-valent metal cation crosslinking agent for 5 seconds or less. For each example, oxygen transmission rates (OTR, in cubic centimeters per square meter per day at 1 atmosphere) were analyzed over a series of relative humidities (RH) and ambient temperature and pressure using an Illinois Instrument 8001 or 8011 oxygen permeation analyzer.

The OTR at 0% RH may be back-calculated using the Change in Transmission Rate Index. For instance, when the Change in Transmission Rate was reported as 1.0, the OTR at the indicated RH was the same as that at 0% RH, whereas when the Change in Transmission Rate was reported as 2.0, the OTR at the indicated RH was twice the OTR measured at 0% RH.

Method 1

The substrate coated with formulation was dipped into a 5% salt bath and then immediately dipped into a distilled water rinse bath. The treated film was air dried and then OTR measured.

Method 2

The substrate coated with formulation was dipped into a 5% salt bath and then immediately dipped into a distilled water rinse bath and agitated for 10 seconds. The treated film was air dried and then OTR measured.

Method 3

The substrate coated with formulation was dipped into a 5% salt bath and then immediately dipped into a distilled water rinse bath and agitated for 10 seconds two times. The treated film was air dried and then OTR measured.

Method 4

The substrate coated with formulation was dipped into a 3% salt bath and then immediately dipped into a distilled water rinse bath and agitated for 10 seconds. The treated film was air dried and then OTR measured.

Method 5

The substrate coated with formulation was conditioned at 50% relative humidity for 24 hours. It was then dipped into a 3% salt bath and then immediately dipped into a distilled water rinse bath and agitated for 10 seconds. The treated film was air dried and then OTR measured.

Method 6

The substrate coated with formulation was dipped into a 4% salt bath and then immediately dipped into a distilled water rinse bath and agitated for 10 seconds. The treated film was air dried and then OTR measured.

Method 7

The substrate coated with formulation was dipped into a 4% salt bath. The treated film was air dried and then OTR measured.

Method 8

The substrate coated with formulation was dipped into a 3% salt bath and then immediately dipped into a distilled water rinse bath and agitated for 10 seconds. The treated film was dried in a 50° C. oven for 5 minutes and then OTR measured.

Method 9

The substrate coated with formulation was dipped into a 4% salt bath for 5 seconds and then immediately dipped into a distilled water rinse bath and agitated for 10 seconds. The treated film was dried in a 50° C. oven for 5 minutes and then OTR measured.

Method 10

The substrate coated with formulation was dipped into a 4% salt bath and then immediately dipped into a distilled water rinse bath and agitated for 10 seconds. The treated film was dried in a 50° C. oven for 5 minutes and then OTR measured.

Method 11

The substrate coated with formulation was dipped slowly for 5 seconds into a 4% salt bath and then immediately dipped into a distilled water rinse bath and agitated for 10 seconds. The treated film was dried in a 50° C. oven for 5 minutes and then OTR measured.

Method 12

The substrate coated with formulation was dipped into a 4% salt bath. The treated film was partially dried with forced air and then dried in a 50° C. oven for 5 minutes and then OTR measured.

TABLE 1

Nanolok ™ PT MM Salt Treated Examples (Montmorillonite containing)

| Ex. | Formulation | Substrate Film Film thickness (microns) | Treatment Method # | Change in Oxygen Transmission Rate Index at % Relative Humidity (RH) (Actual OTR in cc/m2 day atm reported in parentheses) | | | | | |
|---|---|---|---|---|---|---|---|---|---|
| | | | | 25% RH | 35% RH | 50% RH | 65% RH | 72% RH | 80% RH |
| 1 | 35% filler, 8.0% solids | BOPP (1.4 um) | None | 1.0 (1.5) | 0.9 (1.3) | 2.0 (2.9) | 5.5 (8.0) | 14 (21) | 37 (53) |
| 2 | 35% filler, 8.0% solids | BOPP (1.0 um) | 1 | 0.8 (2.8) | 0.7 (2.5) | 1.2 (4.0) | 2.3 (7.8) | 3.6 (12) | 6.3 (21) |
| 3 | 35% filler, 8.0% solids | BOPP (1.1 um) | 2 | 0.9 (3.3) | 1.2 (4.3) | 1.2 (4.4) | 1.6 (5.8) | 2.5 (9.3) | 4.0 (15) |
| 4 | 35% filler, 8.0% solids | BOPP (1.0 um) | 3 | 0.8 (2.8) | 1.2 (4.3) | 1.4 (4.8) | 2.2 (7.6) | 3.7 (13) | 6.2 (22) |
| 5 | 50% filler, 5.0% solids | BOPP (1.2 um) | None | | 1.9 (0.44) | 6.0 (1.4) | 20 (4.5) | 80 (18) | 186 (43) |
| 6 | 50% filler, 5.0% solids | BOPP (0.8 um) | 4 | | 1.9 (2.5) | 5.9 (7.8) | 14 (19) | 22 (29) | 29 (38) |
| 7 | 50% filler, 8.0% solids | PET (0.8 um) | None | | 1.4 (0.24) | 4.2 (0.76) | 35 (6.4) | 85 (15) | 178 (32) |
| 8 | 50% filler, 8.0% solids | PET (0.8 um) | 6 | | 2.0 (1.7) | 5.2 (4.5) | 10 (8.6) | 14 (12) | 21 (18) |
| 9 | 50% filler, 8.0% solids | PET (0.7 um) | 9 | | | 4.9 (8.8) | | | 10 (18) |
| 10 | 50% filler, 8.0% solids | PET (0.7 um) | 10 | | | 3.9 (12) | | | 7.9 (24) |
| 11 | 50% filler, 8.0% solids | PET (0.6 um) | 11 | | | 2.5 (4.7) | | | 7.8 (15) |
| 12 | 50% filler, 8.0% solids + surfactants | BOPP (0.8 um) | None | | | 1.4 (0.5) | | | 232 (93) |
| 13 | 50% filler, 8.0% solids + surfactants | BOPP (1.0 um) | 12 | | | 1.5 (1.2) | | | 38 (30) |

TABLE 2

Nanolok ™ PT Salt Treated Examples (Vermiculite containing)

| Ex. | Formulation | Substrate Film Film thickness (microns) | Treatment Method # | Change in Oxygen Transmission Rate Index at % Relative Humidity (RH) (Actual OTR in cc/m2 day atm reported in parentheses) | | | | | |
|---|---|---|---|---|---|---|---|---|---|
| | | | | 25% RH | 35% RH | 50% RH | 65% RH | 72% RH | 80% RH |
| 14 | 35% filler, 7.5% solids | BOPP (1.2 um) | None | 1.0 (1.4) | 1.1 (1.5) | 1.5 (2.1) | 2.1 (2.9) | 3.3 (4.5) | 6.9 (9.5) |
| 15 | 35% filler, 7.5% solids | BOPP (0.9 um) | 1 | 0.8 (3.1) | 0.8 (3.1) | 0.9 (3.7) | 1.2 (5.0) | 1.6 (6.3) | 2.1 (8.6) |
| 16 | 50% filler, 5.0% solids | BOPP (0.4 um) | None | 1.0 (7.1) | 0.9 (7.0) | 1.1 (8.4) | 1.3 (9.8) | 1.6 (12) | 11 (82) |
| 17 | 50% filler, 5.0% solids | BOPP (0.3 um) | 2 | 0.7 (14) | 0.6 (13) | 0.5 (10) | 0.55 (11) | 0.6 (12) | 1.6 (32) |
| 18 | 50% filler, 7.0% solids | PET (0.8 um) | None | | 1.4 (0.65) | 1.6 (0.74) | 2.4 (1.1) | 4.7 (2.1) | 12 (5.6) |
| 19 | 50% filler, 7.0% solids | PET (0.6 um) | 4 | | 1.2 (0.54) | 1.3 (0.61) | 1.7 (0.79) | 2.6 (1.2) | 5.1 (2.4) |
| 20 | 50% filler, 7.0% solids | PET (0.6 um) | 5 | | 1.4 (0.46) | 1.5 (0.5) | 2.4 (0.8) | 3.4 (1.2) | 7.3 (2.5) |
| 21 | 50% filler, 7.0% solids | PET (1.2 um) | 6 | | 1.3 (0.37) | 1.6 (0.44) | 1.9 (0.51) | 2.4 (0.65) | 3.5 (0.97) |
| 22 | 50% filler, 7.0% solids + surfactant | PET (0.8 um) | None | | | | 1.6 (1.2) | | 12 (8.3) |
| 23 | 50% filler, 7.0% solids + surfactant | PET (1.1 um) | 7 | | | | 1.3 (0.79) | | 9 (5.4) |
| 24 | 50% filler, 7.0% solids + surfactant | PET (1.0 um) | None | 1.0 (1.4) | 0.9 (1.4) | 1.3 (1.9) | 2.0 (3.0) | | 3.2 (4.8) |
| 25 | 50% filler, 7.0% solids + surfactant | PET (1.1 um) | 4 | 0.9 (1.3) | 0.9 (1.3) | 1.0 (1.4) | 1.3 (1.9) | | 1.7 (2.5) |

TABLE 2-continued

Nanolok™ PT Salt Treated Examples (Vermiculite containing)

| Ex. | Formulation | Substrate Film Film thickness (microns) | Treatment Method # | Change in Oxygen Transmission Rate Index at % Relative Humidity (RH) (Actual OTR in cc/m2 day atm reported in parentheses) | | | | | |
|---|---|---|---|---|---|---|---|---|---|
| | | | | 25% RH | 35% RH | 50% RH | 65% RH | 72% RH | 80% RH |
| 26 | 50% filler, 7.0% solids + surfactant | PET (1.0 um) | None | | | 3.7 (1.1) | | | 83 (26) |
| 27 | 50% filler, 7.0% solids + surfactant | PET (0.9 um) | 8 | | | 0.6 (0.8) | | | 2.4 (3.2) |
| 28 | 50% filler, 7.0% solids + surfactant | PET (0.45 um) | None | | 1.0 (1.2) | 1.0 (1.2) | 1.5 (1.8) | 2.5 (3.0) | 8.7 (10) |
| 29 | 50% filler, 7.0% solids + surfactant | PET (0.35 um) | 2 | | 0.7 (1.4) | 0.7 (1.4) | 1.1 (2.3) | 1.5 (3.3) | 3.4 (7.2) |
| 30 | 50% filler, 7.0% solids + stabilizer | PET (0.9 um) | None | | | 1.5 (0.42) | | | 23 (6.4) |
| 31 | 50% filler, 7.0% solids + stabilizer | PET (0.8 um) | 8 | | | 1.4 (0.40) | | | 7.8 (2.2) |
| 32 | 50% filler, 7.0% solids + stabilizer | PET (1.3 um) | None | | | 0.9 (0.62) | | | 13 (8.9) |
| 33 | 50% filler, 7.0% solids + stabilizer | PET (1.1 um) | 8 | | | 0.3 (1.2) | | | 0.9 (3.5) |
| 34 | 55% filler, 6.5% solids | PET (0.7 um) | None | | | 1.3 (0.32) | | | 24 (6.1) |
| 35 | 55% filler, 6.5% solids | PET (0.8 um) | 8 | | | 0.8 (0.41) | | | 4 (2.0) |

The Change in Oxygen Transmission Rate Index reported in Tables 1 and 2 represents a ratio of the Oxygen Transmission Rate of a given film at a specific Relative Humidity compared to the Oxygen Transmission Rate of the same film at 0% Relative Humidity. Generally, the data in Tables 1 and 2, above, indicate that performance when exposed to elevated levels of humidity was compromised, the oxygen transmission rate increased as the relative humidity increased. Differences between treated and non-treated coatings were particularly noted at Relative Humidities of 65% and above. The highest rates of oxygen transmission consistently occurred at 80% Relative Humidity. The application of aluminum salt to the formulations described in Tables 1 and 2 achieved a dramatic reduction in performance loss at elevated levels of relative humidity in every case when the films were treated with multi-valent metal cations.

While the invention has been described in connection with several embodiments, modifications of those embodiments within the spirit and scope of the present invention will be readily apparent to those of skill in the art. The invention is defined in the appended claims.

What is claimed is:

1. A method of preparing a stabilized gas barrier film comprising:
 (a) preparing an aqueous barrier composition including:
  (i) water;
  (ii) an anionically functionalized matrix resin;
  (iii) a platy mineral filler; and
  (iv) optionally, one or more of an additive selected from the group consisting of surfactants, emulsifiers, antifoaming agents, dispersing agents, wetting agents, leveling agents and thickeners;
 wherein the anionically functionalized matrix resin, the platy mineral filler and optional additives are selected such that the barrier coating composition forms a stable aqueous emulsion;
 (b) applying the aqueous barrier composition to a substrate;
 (c) drying the aqueous barrier composition to form a barrier film; and
 (d) treating the dried barrier film with a multi-valent metal crosslinking agent,
wherein the multi-valent metal cation crosslinking agent is operative to stabilize the barrier film against barrier performance loss at elevated levels of relative humidity.

2. The method of preparing a stabilized gas barrier film according to claim 1, wherein the platy mineral filler is selected from substantially exfoliated silicates and platy kaolin.

3. The method of preparing a stabilized gas barrier film according to claim 1, wherein the platy mineral filler comprises a substantially exfoliated silicate selected from the group consisting of bentonite, vermiculite, montmorillonite, nontronite, beidellite, volkonskoite, hectorite, saponite, laponite, sauconite, magadiite, kenyaite, ledikite and mixtures or solutions of the above silicates.

4. The method of preparing a stabilized gas barrier film according to claim 1, wherein the platy mineral filler is hyperplaty kaolin.

5. The method of preparing a stabilized gas barrier film according to claim 1, wherein the platy mineral filler is treated with acid or base prior to being combined with the anionically functionalized matrix resin.

6. The method of preparing a stabilized gas barrier film according to claim 1, wherein the anionically functionalized matrix resin is a polyester ionomer copolymer having a charge density of from 0.1 meq/g polymer to 1 meq/g polymer.

7. The method of preparing a stabilized gas barrier film according to claim 1, wherein the anionically functionalized matrix resin is a polyester ionomer copolymer having a charge density of from 0.3 meq/g polymer to 1 meq/g polymer.

8. The method of preparing a stabilized gas barrier film according to claim 1, wherein the anionically functionalized matrix resin is a sulfopolyester.

9. The method of preparing a stabilized gas barrier film according to claim 1, wherein the multi-valent metal cation crosslinking agent comprises a water-soluble salt of aluminum, titanium or zirconium.

10. The method of preparing a stabilized gas barrier film according to claim 1, wherein the multi-valent metal cation crosslinking agent comprises a water-soluble salt of aluminum.

11. The method of preparing a stabilized gas barrier film according to claim 1, wherein the multi-valent metal cation crosslinking agent comprises a metal cation with a valence of at least 3.

12. The method of preparing a stabilized gas barrier film according to claim 1, wherein the multi-valent metal cation crosslinking agent is present in an aqueous solution at a concentration of less than 10 percent by weight.

13. The method of preparing a stabilized gas barrier film according to claim 1, wherein the dried barrier film is treated with the multi-valent metal cation crosslinking agent for 5 seconds or less.

14. The method of preparing a stabilized gas barrier film according to claim 1, wherein the treated barrier film exhibits stability against barrier performance loss at relative humidity levels of at least 65%.

15. The method of preparing a stabilized gas barrier film according to claim 1, wherein the aqueous barrier composition has a solids content of from about 5 percent to about 30 percent by weight.

16. The method of preparing a stabilized gas barrier film according to claim 1, wherein the platy mineral filler is present in an amount of from 10 percent to 75 percent based on the total solids content.

17. The method of preparing a stabilized gas barrier film according to claim 1, wherein the platy mineral filler is present in an amount of from 55 percent to 75 percent based on the total solids content.

18. A gas barrier film comprising an anionically functionalized matrix resin and a platy mineral filler, prepared by way of (a) preparing an aqueous barrier composition including: (i) water; (ii) an anionically functionalized matrix resin; (iii) a platy mineral filler; and (iv) optionally, one or more of an additive selected from the group consisting of surfactants, emulsifiers, anti-foaming agents, dispersing agents, wetting agents, leveling agents and thickeners followed by (b) applying the aqueous barrier composition to a substrate wherein the anionically functionalized matrix resin, the platy mineral filler and optional additives are selected such that the barrier coating composition forms a stable aqueous emulsion; and (c) drying the aqueous barrier composition to form a barrier film; and (d) treating the dried barrier film with a multi-valent metal crosslinking agent, thereby stabilizing the barrier film against performance loss at elevated levels of relative humidity.

19. A method of preparing a stabilized gas barrier film comprising:
(a) preparing an aqueous barrier composition including:
    (i) water;
    (ii) an anionically functionalized matrix resin having a charge density of from 0.1 meq/g polymer to 1 meq/g polymer;
    (iii) a platy mineral filler; and
    (iv) optionally, one or more of an additive selected from the group consisting of surfactants, emulsifiers, anti-foaming agents, dispersing agents, wetting agents, leveling agents and thickeners;
wherein the anionically functionalized matrix resin, the platy mineral filler and optional additives are selected such that the barrier coating composition forms a stable aqueous emulsion;
(b) applying the aqueous barrier composition to a substrate;
(c) drying the aqueous barrier composition to form a barrier film; and
(d) treating the dried barrier film with a multi-valent metal crosslinking agent,
wherein the multi-valent metal cation crosslinking agent is operative to stabilize the barrier film against barrier performance loss at elevated levels of relative humidity.

20. The method of preparing a stabilized gas barrier film according to claim 19, wherein the platy mineral filler is present in an amount of from 55 percent to 75 percent based on the total solids content.

21. A method of preparing a stabilized gas barrier film comprising:
(a) preparing an aqueous barrier composition including:
    (i) water;
    (ii) an anionically functionalized matrix resin;
    (iii) a platy mineral filler; and
    (iv) optionally, one or more of an additive selected from the group consisting of surfactants, emulsifiers, anti-foaming agents, dispersing agents, wetting agents, leveling agents and thickeners;
wherein the anionically functionalized matrix resin, the platy mineral filler and optional additives are selected such that the barrier coating composition forms a stable aqueous emulsion;
(b) applying the aqueous barrier composition to a substrate;
(c) drying the aqueous barrier composition to form a barrier film; and
(d) treating the dried barrier film with a multi-valent metal crosslinking agent,
wherein the multi-valent metal cation crosslinking agent is operative to stabilize the barrier film against barrier performance loss at elevated levels of relative humidity, such that the ratio of the oxygen transmission rate index at 80% relative humidity of an untreated film to the oxygen transmission rate index at 80% relative humidity of a like film treated with a multi-valent metal cation crosslinking agent is about 6 or greater.

22. The method of preparing a stabilized gas barrier film according to claim 21, wherein the ratio of the oxygen transmission rate index at 80% relative humidity of an untreated film to the oxygen transmission rate index at 80% relative humidity of a like film treated with the multi-valent metal cation crosslinking agent is from about 6 to 35.

23. A gas barrier film comprising an anionically functionalized matrix resin and a platy mineral filler, prepared by way of (a) preparing an aqueous barrier composition including: (i) water; (ii) an anionically functionalized matrix resin; (iii) a platy mineral filler; and (iv) optionally, one or more of an additive selected from the group consisting of surfactants, emulsifiers, anti-foaming agents, dispersing agents, wetting agents, leveling agents and thickeners followed by (b) applying the aqueous barrier composition to a substrate wherein the anionically functionalized matrix resin, the platy mineral filler and optional additives are selected such that the barrier coating composition forms a stable aqueous emulsion; and (c) drying the aqueous barrier composition to form a barrier film; and (d) treating the dried barrier film with a multi-valent metal crosslinking agent, thereby stabilizing the barrier film against performance loss at elevated levels of relative humidity, such that the ratio of the oxygen transmission rate index at 80% relative humidity of a like untreated film to the oxygen transmission rate index at 80% relative humidity of the film treated with the multi-valent metal cation crosslinking agent is about 6 or greater.

24. The gas barrier film according to claim 23, wherein the ratio of the oxygen transmission rate index at 80% relative humidity of a like untreated film to the oxygen transmission rate index at 80% relative humidity of the film treated with the multi-valent metal cation crosslinking agent is from about 6 to 35.

* * * * *